Figure 1:
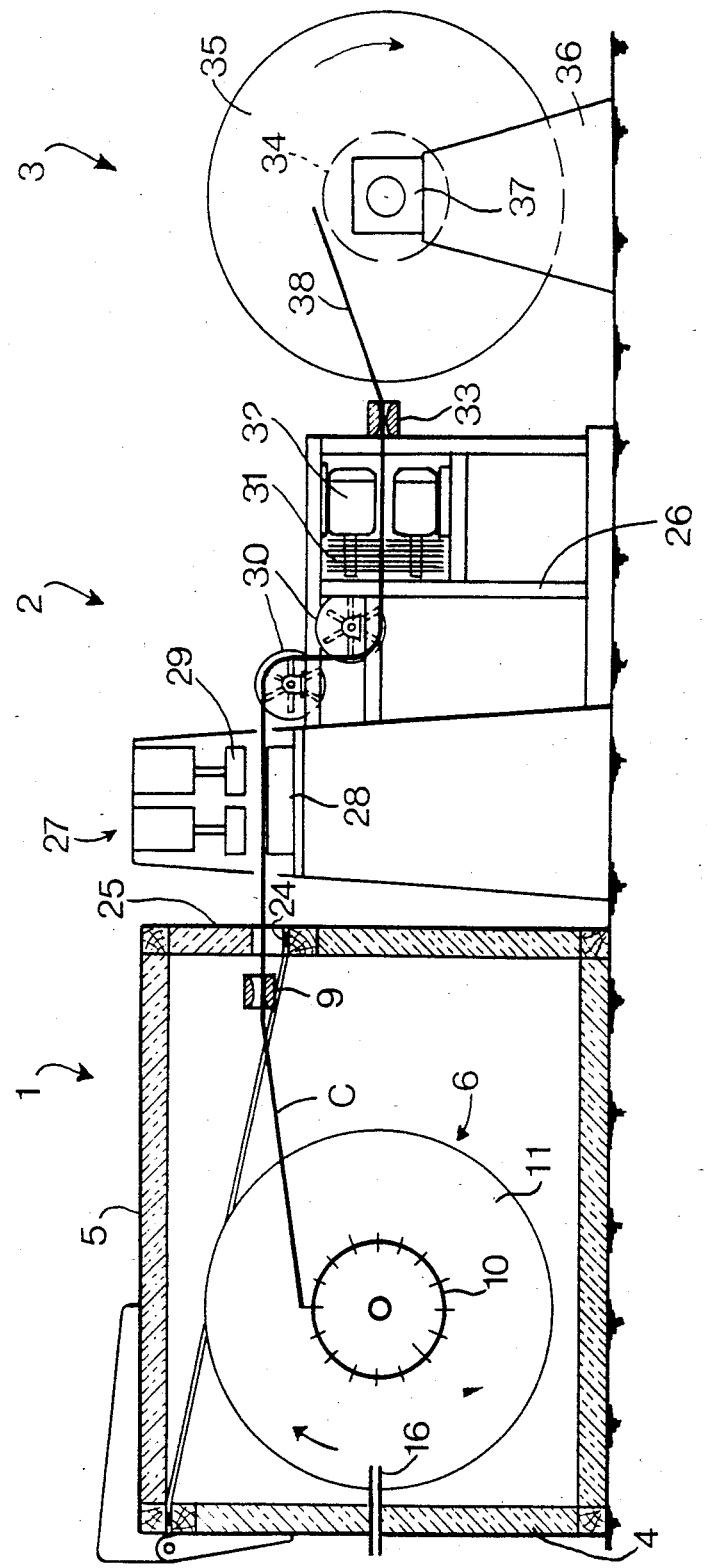

United States Patent [19]

Le Diouron

[11] Patent Number: 4,589,203
[45] Date of Patent: May 20, 1986

[54] METHOD AND APPARATUS FOR THE CRYOGENIC STRIPPING OF ELECTRIC CABLES

[75] Inventor: Raymond Le Diouron, Voiron, France

[73] Assignee: L'Air Liquide, Societe Anonyme pour l'Etude et l'Exploitation des Procedes Georges Claude, Paris, France

[21] Appl. No.: 638,622

[22] Filed: Aug. 7, 1984

[30] Foreign Application Priority Data

Aug. 26, 1983 [FR] France ................... 83 13748

[51] Int. Cl.⁴ .................... H05K 3/00; F25C 5/02
[52] U.S. Cl. ........................ 29/829; 62/320; 62/63; 62/64; 62/514 R; 29/426.2; 241/DIG. 37
[58] Field of Search ............... 29/426.1, 426.2; 62/63, 62/64, 320, 514 R; 241/23, DIG. 37

[56] References Cited

U.S. PATENT DOCUMENTS

| | | | |
|---|---|---|---|
| 2,203,937 | 6/1940 | Barley, Jr. | 62/320 X |
| 3,216,208 | 11/1965 | Cummings | 62/514 R |
| 3,527,414 | 9/1970 | Schorsch | 241/23 |
| 3,647,149 | 3/1972 | Morita et al. | 241/DIG. 37 |
| 3,878,691 | 4/1975 | Asztalos | 62/514 R X |
| 3,882,687 | 5/1975 | Asztalos et al. | 62/514 R X |
| 3,990,641 | 11/1976 | Weston | 241/23 X |

FOREIGN PATENT DOCUMENTS

| | | | |
|---|---|---|---|
| 2050752 | 4/1971 | France | |
| 1300934 | 12/1972 | United Kingdom | |
| 433043 | 11/1974 | U.S.S.R. | 29/426.2 |

Primary Examiner—Howard N. Goldberg
Assistant Examiner—Carl J. Arbes
Attorney, Agent, or Firm—Young & Thompson

[57] ABSTRACT

The cable C to be stripped is wound with non-touching coils and crossed layers of cable onto a drum 6 having a perforated core 10 rotatively mounted in a thermally insulated container 1. By injecting into the container liquid nitrogen under the control of a temperature sensor and by circulating the gases contained in the container through the core of the drum and the cable coils, the whole of the cable is cooled down to a temperature at which the plastics coating and, as the case may be, the outer steel sheath of the cable become brittle. The cable is then unwound and, when it has left the container, it is subjected to various mechanical stresses. The stripped cable is finally wound onto a take-up reel 3. Application in the recovery of scrap in the manufacture of power cables of large diameter and recovery of used electric cables.

16 Claims, 2 Drawing Figures

METHOD AND APPARATUS FOR THE CRYOGENIC STRIPPING OF ELECTRIC CABLES

The present invention relates to the cryogenic stripping of electric cables or the like. It concerns first of all a method for the cryogenic stripping of an electric cable or the like comprising at least one sheath which is brittle at low temperature and a metal core which is deformable at the same temperature, the method being of the type in which the cable is cooled by a cryogenic agent in a container, subjected to mechanical stresses at the outlet of this container and wound on to a take-up reel.

Many techniques exist for treating worn electric cables or manufacturing scrap of such cables (scrap which in particular corresponds to the beginning of the extrusion of the insulating sheath on the metal core and to the cutting of the cable to the desired length) so as to separate the constitutents of the cable for their recovery.

Among these techniques, the most advantageous are those which do not necessitate a prior cutting of the cable for feeding a machine such as a crusher, i.e. techniques which permit the treatment of long lengths of cable.

In this context, it has been proposed to proceed by a burning of the sheath. This manner of operating, in addition to excluding the possibility of recovering the plastics or rubbery material forming the insulating sheath, has the drawback of altering the metal core of the cable by the thermal stresses and the crystallographic changes it produces. Moreover, it is unsuitable for the treatment of cables having an outer protective steel sheath.

Another solution consists in effecting a longitudinal incision in the insulating sheath at room temperature. This solution is satisfactory only in certain cases, for cables of small diameter devoid of an outer protective steel sheath.

In order to avoid these drawbacks, methods of the type mentioned above has also been proposed which are based on the difference in behaviour at low temperature between the exterior sheath or sheaths which become brittle and the metal core of copper or aluminium which remains deformable. Thus, in the patent FR 2,050,752, the cable, which is carried by a drum outside the container, travels through a bath of liquid nitrogen contained in the latter before passing through the mechanical stressing means.

However, this method has not been found to be fully satisfactory. In particular, it is unsuitable for the treatment of cables of large diameter (on the order of for example 30 mm) since the cooling time of these cables, which increases as the square of the diameter, would result in excessively slow cable travelling speeds.

An object of the invention is to provide a method and an apparatus for treating electric cables of any diameter and possibly provided with an outer steel sheath.

The invention therefore provides a method for the cryogenic stripping of the aforementioned type, which comprises cooling in the container the whole of the cable to be stripped and commencing the extraction of the cable from the container when the sheath has reached its temperature at which it is brittle.

Preferably, the cable is first of all wound on to a drum which is rotatively mounted in the container.

Another object of the invention is to provide an apparatus for carrying out said method.

The invention therefore provides an apparatus of the type comprising a drum for receiving the cable to be stripped a cooling container fed with cryogenic agent, means for mechanically stressing the cable disposed at the outlet of the container, and a take-up reel for the stripped cable, wherein means are provided for rotatably mounting the drum inside the container.

In a preferred manner of carrying out the method according to the invention, a forced circulation of gas is produced in the container and the cryogenic agent is injected therein under the control of a temperature sensor. This permits the use of the sensible heat of the vaporized cryogenic agent in addition to its vaporization heat and operating just at the desired temperature, which renders the method particularly inexpensive.

In this case, in order to ensure an effective cooling of the cable, it is advantageous to provide the drum with a perforated core and to arrange that the forced circulation means include a fan disposed coaxially with this core at one end of the latter.

Figure 2:
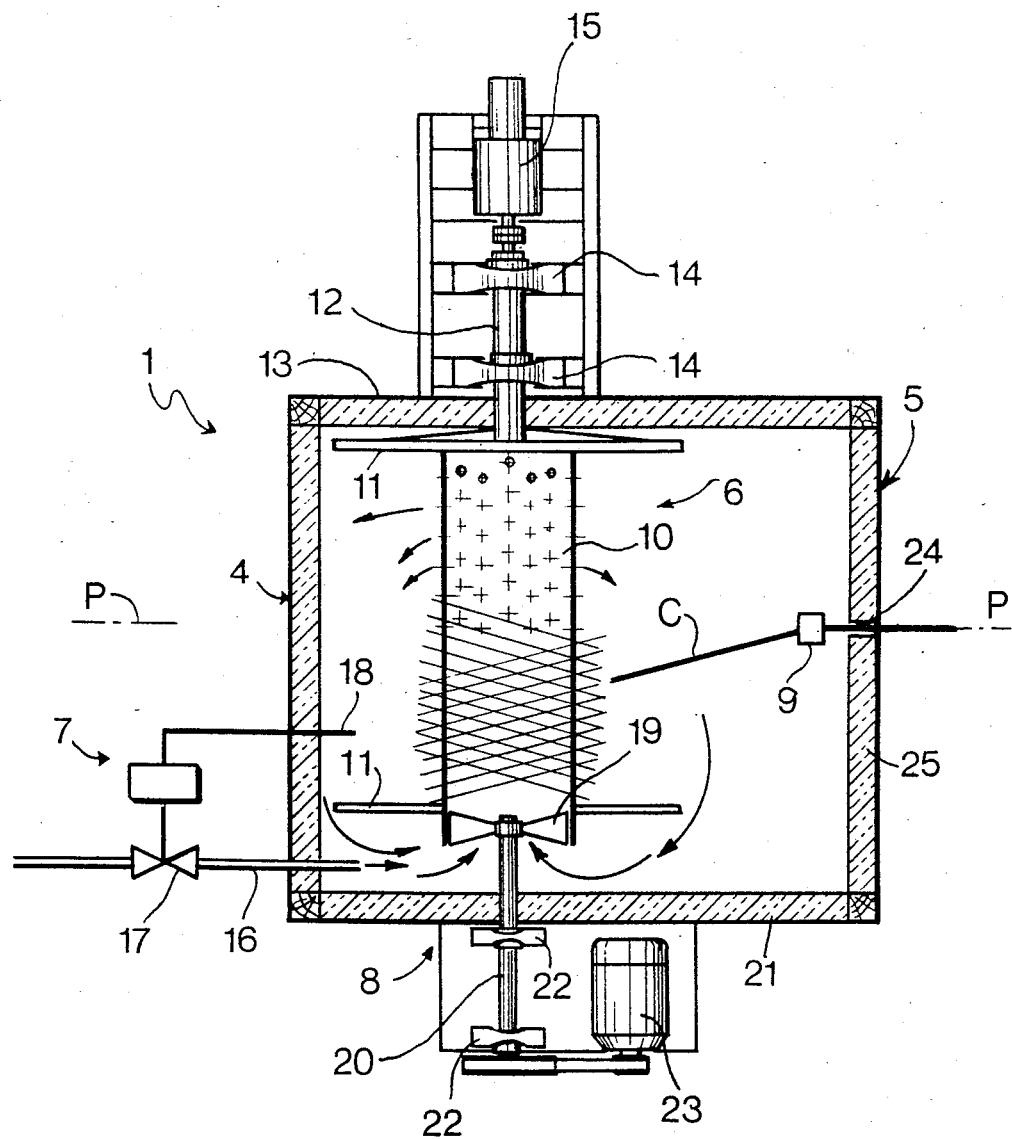

An example of the carrying out of the invention will now be described with reference to the accompanying drawings, in which:

FIG. 1 is a diagrammatic side elevational view, partly in longitudinal section of a cryogenic stripping apparatus according to the invention, and FIG. 2 is a plan view, partly in section, of a part of this apparatus.

The apparatus shown in FIGS. 1 and 2 is adapted to strip a relatively long length of an electric cable C comprising mainly a core of copper or aluminium, an insulating sheath of plastics or rubbery material and optionally an outer protective steel sheath.

This apparatus comprises mainly a thermally insulated container 1, mechanical stressing means 2 and a take-up reel 3.

The container 1 comprises a body 4 on which is pivotally mounted a cover 5, a drum 6 permanently mounted in the container, a liquid nitrogen injecting device 7, a fan 8 and a cable guide 9.

The drum 6 consists of a perforated and hollow cylindrical core 10 carrying a flange 11 at each end. One of the flanges 11 closes the coresponding end of the core 10 and is fixed to the end of a shaft 12 which extends in a fluidtight manner through a lateral wall 13 of the body 4 of the container 1 and is carried by two bearings 14 located outside and on the same side of the container. Beyond these two bearings, the shaft 12 is coupled at its other end to the output shaft of a motorspeed variator unit 15. The drum 6 is thus mounted in the container 1 in a cantilever manner. The other flange 11 is annular and leaves the corresponding end of the core 10 open.

The injection device 7 comprises a conduit 16 connected to a source of liquid nitrogen (not shown) and communicating with the interior of the container 1. This conduit is provided with an electrovalve 17 controlled by a temperature sensor 18 which measures the temperature prevailing in the container 1. As a modification, the conduit 6 could be connected to a source of carbon dioxide.

Fan propeller 19 is placed coaxially with the drum 6 in the open end of the core 10. The shaft 20 of this propeller extends in a fluid tight manner through the lateral wall 21 of the body 4 of the container 1, is carried outside the latter by two bearings 22 and is driven by a motor 23.

The cable guide 9 is located in front of a small opening 24 provided in the front wall 25 of the cover 5 of the container in the vertical plane of symmetry P of the drum 6.

The mechanical stressing means 2 (not shown in FIG. 2) are carried roughly in the plane P by a common frame 26 located outside the container 1 close to the wall 25. These means comprise in the downstream direction relative to the direction of travel of the cable:

a percussion device 27 comprising an anvil 28 above which there are provided two hammers 29 aligned in the plane P;

two freely rotatable bending rollers 30 whose axes are offset both longitudinally and vertically, and two rotatable brushes 31 which are driven by respective motors 32 and have their axes parallel to each other and to the plane P.

At its downstream end, the frame 26 is provided with a cable guide 33 contained in the plane P.

The take-up reel 3 can be dismantled, i.e. it comprises two separable semi-cores 34 each carrying a flange 35. It is detachably mounted on a support 36 provided with a motor 37 for driving the reel in rotation.

In operation, the cable C is first of all wound on to the drum 6 by rotating the latter at the desired speed by means of the motor-speed variator unit 15. The winding is effected, on one hand, with non-touching coils, for each layer, and, on the other hand, with crossed layers, i.e. each winding layer is wound in a direction opposed to the direction of winding of the adjacent layer or layers. This produces on the core 10 of the drum 6 a structure which is very permeable to the gases. The free end of the cable is passed through the cable guide 9, the opening 24, the stressing means 2 and the cable guide 33 and is hooked to the core 34 of the take-up reel 3, and the drum 6 is held stationary.

When these operations have been finished, the container 1 is put into a cold state. For this purpose, a forced circulation is produced in this container by means of the fan 19, and liquid nitrogen is injected through the conduit 16 until a temperature is reached and then maintained which is sufficiently low to render the insulating sheath, and, as the case may be, the outer steel sheath of the cable C brittle while the core 38 of copper or aluminium of the cable remains deformable at this temperature. As illustrated in FIG. 2, the gas circulated by the fan 19 axially enters the core 10 of the drum 6 through one end and issues radially from the core through the perforations of the latter and through the layers of cable wound on the core, which produces an effective and homogeneous cooling of the whole of the cable.

At the end of a certain period of time, which can be easily determined for each type of cable, the sheath or sheaths are rendered brittle. Note that this time is practically independent of the length of the treated cable owing to the winding method and the circulation of the gases described above. The take-up reel 3 is then driven in rotation by the motor 37 and the percussion device 27 and the brushes 31 are brought into action.

In this way the cable C gradually issues from the container 1 through the opening 24, the hammers 29 break the sheath or sheaths, the rollers 30 detach the broken pieces, and the brushes 31 finally clean the core 38 of the cable. It is therefore this stripped core which is wound on to the core 34 of the take-up reel 3. Collecting bins (not shown) may be provided on the frame 26 for collecting the fragments removed by the means 2.

When the whole of the cable has been stripped, the reel 3 is dismantled and this supplies the stripped cable in the form of a compact roll which may be directly sent to a second melting furnace for reusing the copper or aluminium.

As a modification, the drum 6 may be removable so that it is possible to carry out the cable winding operation on this drum at a more suitable place. In this case, the motor-speed variator unit 15 associated with the container 1 may be eliminated. For example, there may be used a mobile drum-carrying frame equipped with a motor-speed variator, and the container 1 may be provided with a door for placing this assembly in the position shown in FIG. 2.

What is claimed is:

1. A method for effecting a cryogenic stripping of an electric cable or the like comprising at least a sheath which is brittle at low temperature and a metal core deformable at said temperature, said method comprising cooling the cable with a cryogenic agent in a container, subjecting the cable to mechanical stresses at the outlet of said container and winding the cable on to a take-up reel, the whole of the cable to be stripped being cooled in said container and the extraction of the cable from the container being commenced when the sheath has reached a temperature at which the sheath becomes brittle.

2. A method according to claim 1, comprising first of all winding the cable on to a drum which is rotatively mounted in the container.

3. A method according to claim 1, comprising creating in the container a forced circulation of gas and injecting the cryogenic agent into the container under the control of a temperature sensor.

4. A method according to claim 2, comprising creating in the container a forced circulation of gas and injecting the cryogenic agent into the container under the control of a temperature sensor, the gas being axially circulated through the core of the drum and radially through a layer or layers of cable wound on the core of the drum.

5. A method according to claim 2, comprising winding the cable on to the core of the drum with non-touching coils, successive layers of cable wound on to the core of the drum being wound in alternately opposed directions.

6. A method according to claim 4, comprising winding the cable on to the core of the drum with non-touching coils, successive layers of cable wound on to the core of the drum being wound in alternately opposed directions.

7. A method according to claim 2, comprising creating in the container a forced circulation of gas and injecting the cryogenic agent into the container under the control of a temperature sensor, the cable being wound on to the core of the drum with non-touching coils, successive layers of cable wound on to the core of the drum being wound in alternately opposed directions.

8. A method according to claim 1, wherein the cryogenic agent is liquid nitrogen.

9. A method accoring to claim 1, wherein the cryogenic agent is carbon dioxide.

10. An apparatus for effecting a cryogenic stripping of electric cables or the like, comprising a cooling container, means for feeding cryogenic agent to the container, a drum operably associated with said container for receiving the cable to be stripped wound thereon, means operably associated with said container for rotatably mounting the drum inside the container, the container having an outlet for cable unwound from the drum, means for mechanically stressing the cable located adjacent said outlet thereby to strip from the cable material rendered brittle by said cryogenic agent in said container, and a take-up reel for the stripped cable located adjacent said stressing means.

11. An apparatus according to claim 10, and means operatively associated with said container for effecting a forced circulation of cold gases in the container, and a temperature sensor operatively associated with said feeding means for sensing the temperature of said cold gases for controlling said feeding means.

12. An apparatus according to claim 11, said drum having a perforated core, said means for effecting a forced circulation comprising a fan located at one end of the perforated core and disposed coaxially with the perforated core.

13. An apparatus according to claim 10, wherein the drum is permanently mounted inside the container.

14. An apparatus according to claim 10, wherein the take-up reel is adapted to be dismantled.

15. An apparatus according to claim 10, wherein said stressing means comprises bending rollers.

16. An apparatus according to claim 15, wherein said stressing means also comprises a percussion device disposed between said container outlet and said bending rollers.

* * * * *